Aug. 7, 1934.   E. M. BERGSTROM ET AL   1,969,540
PIPE
Filed Nov. 10, 1930
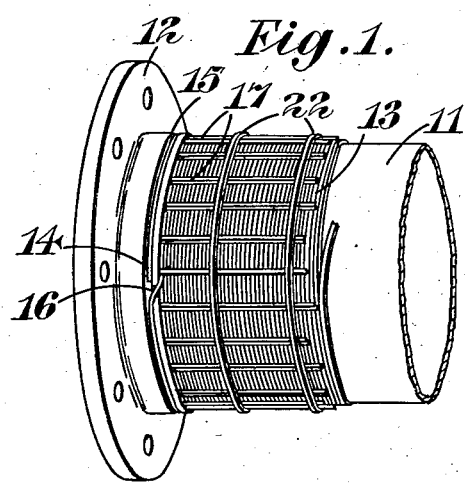
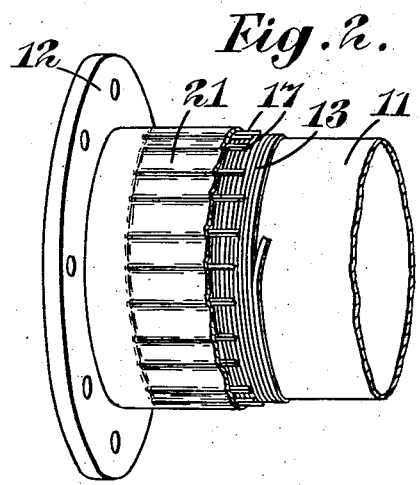

Patented Aug. 7, 1934

1,969,540

UNITED STATES PATENT OFFICE 1,969,540

PIPE

Eric Maurice Bergstrom, Goring-on-Thames, and William Pollard Digby, London, England Application November 10, 1930, Serial No. 494,766
In Great Britain November 19, 1929

7 Claims. (Cl. 137—75)

This invention is for improvements in or relating to pipes and relates particularly to the manufacture of improved metal pipes for use in carrying fluids under high pressures. It is intended that pipes constructed according to the present invention shall not tear along the weld and that a fracture in the pipe shall be prevented from spreading. Such improved pipes may be used on hydroelectric systems utilizing water under high pressure, or for carrying gases such as hydrogen or nitrogen under high pressures of 200 atmospheres and over, or for carrying high pressure superheated steam or other heated gases at pressures of say 1000 pounds per square inch and over.

Our invention although particularly applicable to high pressures such as those referred to above is not of course limited to such pressures and may be advantageously employed for pipes intended to carry fluids at lower pressures such as for example those used in the water supply systems of urban areas, in oil pipe lines and in other similar systems.

In hydroelectric work, it has been for many years necessary to limit the diameter of pipes working under the pressure of static heads of one thousaind to three thousand feet and upwards by reason of the difficulty of riveting or welding the thick plates required for pipes to withstand the pressure. Lap welded and solid drawn pipes have been reinforced by suitably spaced steel bands shrunk on to a thinner shell, say, one fourth or one third of the calculated thickness required for the working pressure, but such forms of construction are costly owing to the extreme precision requisite in the gauging of the outside diameter of the pipe and in the boring of each forged steel reinforcing ring which is heated and shrunk on to the thinner shell. While the stresses in each ring can be calculated from a knowledge of the tensile properties of the steel from which it is made, skilled supervision is necessary throughout the construction of reinforced pipes of this class. Moreover, unequal stresses are set up in the inner shell.

According to this invention there is provided a reinforced conduit comprising an inner tube of metal, which may have flanges or collars attached, a wire wound spirally under tension upon the tube, longitudinally extending strips of metal over said wire windings and secured thereto, by brazing or welding for example, and additional metal reinforcing means over said longitudinally extending strips.

The additional reinforcing means may be a metal coating applied for example by spraying, dipping, or sherardizing, or by electro-deposition, and may consist of, for example, copper, iron, nickel, zinc, chromium or the like.

The longitudinal (axial) strips of metal secured outside the wound wire serve in conjunction with the additional reinforcing means as a means for securing one wire to another, thus preventing the sudden release of the wire in the event of a wire fracturing from an undiscovered flaw when the pipe is in use.

When the additional reinforcement is in the form of a sheathing of metal applied over said longitudinally extending strips it also seals the strips and the wire and shell against corrosion due to moisture. The reinforcing wire would if not coated be electro-positive to the mild steel shell and liable to corrosion from atmospheric causes alone.

Each layer of wire may be built up of a single wire or of two or more wires wound side by side.

The wire may be cylindrical or rectangular or hexagonal, the selection of the section being determined by ease of manufacture, or by the desirability in some cases of using more than one layer of the reinforcement of high tensile wire.

The conduits may be flanged or provided with rings or collars and the wire wound around the conduit between the flanges and secured to the flange and/or the body of the pipe for example by clamping or by brazing, welding or electro deposition, or by the employment of a combination of these methods. The welding may be conveniently carried out for example by the electric resistance method.

The shell may be of the solid drawn type or may have longitudinal joints welded, for example, by water-gas, or the shell may consist of a butt or lap welded tube brought to welding temperature by furnacing.

The longitudinal strips may be secured to the wire windings, for example by brazing or welding. The longitudinal (axial) strips may further be secured to hoops and the cage thus formed drawn over the wire windings.

According to a further modification of the invention a metal tube may be shrunk on over the wire windings, or instead of a single tube a number of contiguous tubes or bands may be employed.

The wire windings and embracing strips or sleeves may be sherardized or galvanized, and the sherardizing or galvanizing may be carried out in situ.

Further according to the present invention metal conduits, for example pipes, are provided which have collars or rings secured to the tube (for example by riveting or welding) and wire wound under tension around the surface of the tube between the collars. The wire is secured and further strengthened in the manner already described. The wire may be galvanized before winding and may also be treated with bitumastic or other suitable paint.

It will be understood that the present invention is not limited to the application of a single layer of wire winding to a metal conduit, or of wire of any particular cross-section or of any particular material, and it is within the scope of this invention to employ any number of layers of windings. It will also be understood that the longitudinal strips may be contiguous or spaced and instead of being welded or brazed to the wire windings may be clamped to them by suitable means, for example by further windings of wire or building up bands by spraying on metal. The longitudinal strips may be discontinuous and the space between adjacent strips may be occupied by further wire windings.

Conduits, manufactured by any of the processes described above may be further strengthened to resist longitudinal stresses by tie-rods between the flanges outside the windings.

Where it is necessary to fit anchor rings at the anchorages of wire wound reinforced pipes, this may be done by shrinking, or where the nature of electro deposited sheath permits by welding. The securing of such rings may also be carried out, for example electrolytically or by brazing or galvanizing. The cradles or cover would have projections transferring all anchoring thrusts to the concrete.

In the case of pipes with flexible joints of the class known under the registered trade-mark "Victaulic" in which the joint between each pair of consecutive pipes is made by a housing secured in grooves turned in the ends of the pipes, we weld or screw a socket with grooves turned to receive the housing and secure the wire reinforcement to the screwed or welded socket as described in the case of an ordinary flanged pipe.

The following are descriptions by way of example and with reference to the accompanying drawing of several forms of reinforced pipes constructed according to the present invention.

Like parts are denoted by like reference numerals throughout the drawing.

Figure 1 shows a portion of a wire wound pipe in which an inner metal shell 11 has secured to it a flange 12. High tensile wire 13 is secured, for example by clamping means 14 in a groove 15 in the flange 12 and passes via the inclined groove 16 from the flange to the outer surface of the pipe. A cage composed of longitudinal strips 17 and hoops 22 is drawn over the wire windings and secured to them by brazing or welding.

Figure 2 shows a portion of a pipe in which the longitudinal (axial) strips 17 are covered with a sheathing of metal 21.

Two convenient methods of manufacturing reinforced pipes of the types shown in Figures 2 and 1 respectively will now be described.

Example I

A mild steel welded tube 11 flanged at each end has one end of a length of high tensile steel wire 13 secured by clamping means 14 in a groove 15 in one of the flanges 12 or to the body of the tube near the flange. The tube is mounted in a lathe and one or more layers of the wire are wound onto the tube under tension and the end of the wire secured to one flange or the other by clamping.

The pipe is then removed from the lathe and strips of metal are laid axially of the tube on the windings and brazed thereto. A layer 21 of iron is now electrically deposited on the strips and wire windings and serves as an additional reinforcement. The interior of the pipe and the flanges may be protected from the electrolyte by means of a suitable coating of paint or enamel.

Example II

A 20 foot length of mild steel tube flanged at each end is mounted in a lathe and one end of a length of wire 13 of rectangular cross-section (60 mils. by 100 mils.) and of high tensile strength is secured to the tube by brazing. The wire is then wound around the tube and the other end also secured to the tube. A cage is formed of strips of metal 17 and circumferential hoops 22 brazed thereto and is drawn a close fit over the windings 13. This cage is secured to the windings by brazing or by similar means.

We claim:—

1. A reinforced conduit comprising an inner metal tube, a wire wound spirally under tension upon the tube, longitudinally extending strips of metal over said wire windings and secured thereto and a sheathing of metal applied over said longitudinally extending strips.

2. A reinforced conduit comprising an inner metal tube, a wire wound spirally under tension upon the tube, longitudinally extending strips of metal over said wire windings and secured thereto and circumferential hoops over said longitudinally extending strips and secured thereto.

3. A reinforced conduit comprising an inner metal tube having a flange on each end thereof, a wire wound spirally under tension upon the tube, said wire being attached at each end thereof to the tube, longitudinally extending strips of metal over said wire windings and secured thereto and a sheathing of metal applied over said longitudinally extending strips.

4. A reinforced conduit comprising an inner metal tube having a flange on each end thereof, a wire wound spirally under tension upon the tube, said wire being attached at each end thereof to the tube, longitudinally extending strips of metal over said wire windings and secured thereto and circumferential hoops over said longitudinally extending strips and secured thereto.

5. A reinforced conduit comprising an inner metal tube having a flange on each end thereof, a wire wound spirally under tension upon the tube, said wire being attached at each end thereof to a flange, longitudinally extending strips of metal over said wire windings and secured thereto and a sheathing of metal applied over said longitudinally extending strips.

6. A reinforced conduit comprising an inner metal tube having a flange on each end thereof, a wire wound spirally under tension upon the tube, said wire being attached at each end thereof to a flange, longitudinally extending strips of metal over said wire windings and secured thereto and circumferential hoops over said longitudinally extending strips and secured thereto.

7. A reinforced conduit comprising an inner metal tube, a wire wound spirally under tension upon the tube, longitudinally extending strips of metal over said wire windings and secured thereto, and a circumferentially complete metal binding applied over said longitudinally extending strips uniformly distributed along the whole length thereof.

ERIC MAURICE BERGSTROM.
WILLIAM POLLARD DIGBY.